US011892571B2

(12) United States Patent
Golomedov et al.

(10) Patent No.: US 11,892,571 B2
(45) Date of Patent: Feb. 6, 2024

(54) METHODS AND SYSTEMS FOR ONLINE SYNCHRONIZATION OF SENSORS OF SELF-DRIVING VEHICLES (SDV)

(71) Applicant: YANDEX SELF DRIVING GROUP LLC, Moscow (RU)

(72) Inventors: Aleksey Evgenievich Golomedov, rp Ilinsky (RU); Vitaly Vladimirovich Podkolzin, Moscow (RU); Konstantin Olegovich Kiselev, g Smolensk (RU)

(73) Assignee: DIRECT CURSUS TECHNOLOGY L.L.C, Dubai (AE)

( * ) Notice: Subject to any disclaimer, the term of this patent is extended or adjusted under 35 U.S.C. 154(b) by 738 days.

(21) Appl. No.: 17/039,972

(22) Filed: Sep. 30, 2020

(65) Prior Publication Data
US 2021/0190923 A1 Jun. 24, 2021

(30) Foreign Application Priority Data

Dec. 24, 2019 (RU) .......................... RU2019143603

(51) Int. Cl.
G06K 9/00 (2022.01)
G01S 7/497 (2006.01)
G01S 17/931 (2020.01)
G01S 17/89 (2020.01)

(52) U.S. Cl.
CPC .............. G01S 7/497 (2013.01); G01S 17/89 (2013.01); G01S 17/931 (2020.01)

(58) Field of Classification Search
CPC .................................................... G01S 17/86
See application file for complete search history.

(56) References Cited

U.S. PATENT DOCUMENTS

| 8,314,816 | B2 | 11/2012 | Feyereisen et al. |
| 9,369,689 | B1* | 6/2016 | Tran ..................... H04N 13/239 |
| 2015/0317781 | A1* | 11/2015 | Napier ..................... G06T 5/002 348/46 |
| 2016/0249039 | A1* | 8/2016 | Tran ..................... H04N 13/139 |

(Continued)

FOREIGN PATENT DOCUMENTS

| EP | 3438777 A1 | 2/2019 |
| RU | 2609434 C2 | 2/2017 |
| WO | 2019079511 A1 | 4/2019 |

OTHER PUBLICATIONS

Russian Search report dated Jul. 29, 2021 in respect of the counterpart Russian Patent Application RU 2019143603.

(Continued)

*Primary Examiner* — Hadi Akhavannik
(74) *Attorney, Agent, or Firm* — BCF LLP

(57) ABSTRACT

A method of and a system for synchronizing data for operating a Self-Driving Vehicle (SDV) are provided. The method comprises: causing, by an electronic device, a camera system and a LIDAR system to provide the image data and the map data to the electronic device in a common time referential, determining, by the electronic device, a first timestamp for the map data, determining, by the electronic device, a second timestamp for the image data, determining, by the electronic device, a temporal offset between the first timestamp and the second timestamp, using, by the electronic device, the temporal offset to trigger a delay between subsequent snapshots generated by the camera system.

19 Claims, 9 Drawing Sheets

(56) References Cited

U.S. PATENT DOCUMENTS

| | | | |
|---|---|---|---|
| 2017/0030703 A1* | 2/2017 | Cosic | G01S 13/86 |
| 2017/0124781 A1* | 5/2017 | Douillard | G08G 1/207 |
| 2018/0088584 A1* | 3/2018 | Tascione | G05D 1/0276 |
| 2018/0190046 A1* | 7/2018 | Levinson | G01S 7/4972 |
| 2018/0329066 A1* | 11/2018 | Pacala | H04N 23/73 |
| 2020/0174130 A1* | 6/2020 | Banerjee | G01S 17/89 |

OTHER PUBLICATIONS

Extended European Search Report dated Mar. 5, 2021 in respect of the counterpart European Patent Application 20197957.2.

\* cited by examiner

METHODS AND SYSTEMS FOR ONLINE SYNCHRONIZATION OF SENSORS OF SELF-DRIVING VEHICLES (SDV)

CROSS-REFERENCE

The present application claims priority to Russian Patent Application No. 2019143603, entitled "Methods and Systems for Online Synchronization of Sensors of Self-Driving Vehicles (SDV)", filed Dec. 24, 2019, the entirety of which is incorporated herein by reference.

FIELD OF TECHNOLOGY

The present technology relates to computer-implemented methods and systems for synchronising sensors used by a Self-Driving Vehicle (SDV) to navigate; more specifically, the present technology relates to LIDAR and camera synchronization.

BACKGROUND

Several computer-based navigation systems that are configured for aiding navigation and/or control of vehicle have been proposed and implemented in the prior art. These systems range from more basic map-aided localization based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control system, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously vehicles (also, referred to herein as a "Self-Driving Vehicles", "SDVs") include computer systems that can cause the vehicle to accelerate, break, stop, change lane and self-park.

In order to effectively execute these actions, the computer systems include, or otherwise communicatively coupled with, a plurality of sensors including, for example, a camera and a Light Detection and Ranging (LIDAR) sensor. When installed onto the vehicle, the LIDAR sensor and the camera, by default, operate independently collecting data indicative of the surrounding of the vehicle. The LIDAR sensor rotates, at a predetermined rotation frequency (one rotation cycle in 200 ms, for example), around its vertical central axis collecting data in a form of LIDAR point clouds. The camera collects data in a form of snapshots shooting in the same direction (as being rigidly fixed therein) at a predetermined shooting frequency (once in 30 ms, for example). During an installation process (or a maintenance process, for example), the LIDAR sensor and the camera may be synchronized to be able to both collect data indicative of one and the same predetermined portion of the surroundings of the vehicle at a same moment in time.

However, during the operation of the vehicle, the LIDAR sensor and the camera may become desynchronized due to various reasons. These reasons may include, for example, different times of data updates of the LIDAR and the camera, or some mechanical effects—abrupt acceleration/deceleration of the vehicle, driving over a road hump, or a sharp turn. All these reasons may cause the LIDAR and camera desynchronization, which results, for example, in the computer system of the vehicle receiving inconsistent data about an object (another vehicle, a pedestrian, or any obstacle) from the LIDAR and the camera.

The acuteness of this problem is illustrated by the following hypothetical scenario. Suppose that the SDV is driving along the route determined, by the computer system, based on the data received form the LIDAR and the camera. At one moment, the computer system of the vehicle may receive, from the LIDAR sensor, data indicative of another vehicle moving in front of the vehicle; whereas according to the data received from the camera, that vehicle may be already put of sight of the SDV. Such inconsistency in input data received form different sensors associated with the SDV may make generating a trajectory for the SDV challenging.

International Application No.: WO 2019079511 A1 published on Apr. 25, 2019 assigned to DeepMap, Inc. and entitled "LIDAR and Camera Synchronization" teaches a method and system for synchronizing a lidar and a camera on an autonomous vehicle. The system selects a plurality of track samples for a route including a lidar scan and an image. For each track sample, the system calculates a time shift by iterating many time deltas. For each time delta, the system adjusts a camera timestamp by that time delta, projects a lidar scan onto the image as a lidar projection according to the adjusted camera timestamp, and calculates an alignment score of the lidar projection for that time delta. The system defines the time shift for each track sample as the time delta with the highest alignment score. The system then models time drift of the camera compared to the lidar based on the calculated time shifts for the track samples and synchronizes the lidar and the camera according to the modeled time drift.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

The developers have recognized that there is a need for dynamic synchronization of the time when the camera is taking a snapshot with the time when the LIDAR sensor is projecting its laser(s). In other words, non-limiting embodiments of the present technology have been developed based on developers' appreciation of a need for synchronizing data generated by the camera and the LIDAR sensor in real time, while the vehicle is moving. More specifically, developers have set out to devise a method of synchronizing the camera and the LIDAR sensor without a need for the vehicle to be specifically maintained for the synchronization, to be stopped for synchronization, or otherwise to require synchronization in laboratory or garage conditions. By so doing, the computer system would acquire additional robustness against the above-mentioned mechanical effects causing the desynchronization of the LIDAR sensor and the camera, which may reduce time (and financial expenses) for maintenance of the vehicle.

The developers of the present technology have realized that the identified problem associated with the synchronization of the LIDAR sensor and the camera may be addressed by associating both the LIDAR predetermined scanning frequency and the camera predetermined scanning frequency with astronomical time. By so doing, the computer system, first, may determine respective first and second timestamps where the LIDAR and the camera both collect data of the predetermined portion of the vehicle surroundings; and second, the computer system may determine a temporal offset between the first and the second timestamps. Having determined the temporal offset, the computer system may then use it to modify (reduce, for example) the camera predetermined scanning frequency to get synchronized with the LIDAR sensor for collecting data of the predetermined portion of the vehicle surroundings simultaneously.

Developers have appreciated that iteratively repeating the above-mentioned steps would keep the LIDAR sensor and the camera synchronized on the go, i.e., in real time at least partially addressing recurrent instances of desynchronization.

In contrast with some prior art approaches, the present technology, in order to determine the temporal offset, uses a common time referential based on the astronomical time instead of common objects identified in both a camera snapshot and in a respective LIDAR point cloud.

In accordance with one broad aspect of the present technology, there is provided a computer-implemented method of synchronizing data for operating a Self-Driving Vehicle (SDV). The data is generated by a camera system and a LIDAR system, and the camera system and the LIDAR system are communicatively coupled to an electronic device. The data includes: (i) image data of the camera system mounted onto the SDV for generating the image data about a pre-determined portion of a surroundings of the SDV, the camera data being in a form of a sequence of snapshots generated by the camera system, the sequence of snapshots representing the pre-determined portion at different moments in time, and (ii) map data from a LIDAR system mounted to the SDV for generating the map data about the surroundings of the SDV including the pre-determined portion, the map data being in a form of data points generated by the LIDAR system, the data points representing objects located in different portions of the surroundings of the SDV at different moments in time. The method comprises: causing, by the electronic device, the camera system and the LIDAR system to provide the image data and the map data to the electronic device in a common time referential, the common time referential being an indication of an absolute time during which the data is generated; determining, by the electronic device, a first timestamp for the map data, the first timestamp corresponding to a given moment in time in the common time referential during which the LIDAR system generated data points representing objects located in the pre-determined portion; determining, by the electronic device, a second timestamp for the image data, the second timestamps corresponding to an other given moment in time in the common time referential during which the camera system has been generating a given snapshot of the pre-determined portion; determining, by the electronic device, a temporal offset between the first timestamp and the second timestamp, the temporal offset being indicative of a difference between the given moment in time and the other given moment in time in the common time referential; using, by the electronic device, the temporal offset to trigger a delay between subsequent snapshots generated by the camera system, such that (i) at least one subsequent snapshot is generated by the camera system and (ii) subsequent data points about the pre-determined portion is generated by the LIDAR system, at a same future moment in time in the common time referential.

In some implementations of the method, the using the temporal offset is executed during operation of the SDV.

In some implementations of the method, the synchronizing the data for operating the SDV is executed substantially continuously during operation of the SDV.

In some implementations of the method, the causing the camera system to provide the image data is executed during a first iteration of an operation of the camera system, and wherein the using is executed for a subsequent operation of the camera system.

In some implementations of the method, the subsequent operation is a pre-determined number of subsequent iterations.

In some implementations of the method, the above method is repeated after the pre-determined number of subsequent iterations for an additional number of subsequent iterations.

In some implementations of the method, the camera system has a field of view that coincides with the pre-determined portion of the surroundings of the SDV when mounted onto the SDV.

In some implementations of the method, the causing includes employing a PTP protocol by the electronic device to communicate the indication of the absolute time to the camera system and the LIDAR system.

In some implementations of the method, the indication of absolute time is an indication of astronomical time.

In some implementations of the method, the LIDAR system is a rotational LIDAR system, such that the LIDAR system generates data points representing objects located in a first portion of the surroundings of the SDV at a first moment in time and where the first portion is associated with an angular position of the LIDAR system at the first moment in time.

In some implementations of the method, the LIDAR system generates data points representing objects located in a second portion of the surroundings of the SDV at a second moment in time and where the second portion is associated with the angular position of the LIDAR system at the second moment in time, the angular position of the LIDAR system being different at the first moment in time and at the second moment in time, the first portion being different from the second portion.

In some implementations of the method, the determining the first timestamp comprises: acquiring, by the electronic device, an indication of a pre-determined angular position of the LIDAR system, such that when the LIDAR is at the pre-determined angular position the LIDAR generates data points about objects located in the pre-determined portion, determining, by the electronic device, the first timestamp as a moment in time in the common time referential at which the LIDAR system is at the pre-determined angular position.

In some implementations of the method, the determining the first timestamp is executed by the electronic device employing a timestamp determination algorithm.

In some implementations of the method, the given snapshot is generated by the camera system during a snapshot-generating interval of time, the second timestamp being the moment in time in the common time referential that corresponds to a midpoint in the snapshot-generating interval of time.

In some implementations of the method, the using, by the electronic device, the temporal offset to trigger the delay between subsequent snapshots generated by the camera system, comprises: causing the camera system to add a snapshot time delay after a given future snapshot.

In some implementations of the method, the snapshot time delay is a plurality of snapshot time delays added after respective future snapshots and which are equal in time to a duration of the temporal offset.

In some implementations of the method, wherein the LIDAR system operates in rotational cycles indicative of a LIDAR scanning frequency and the camera system operates in scanning phases indicative of a camera scanning frequency, and wherein a given rotational cycle of the LIDAR system equals a pre-determined multiplier number of scanning phases of the camera system, and wherein the plurality of snapshot time delays is spread over a number of future snapshots corresponding to the pre-determined multiplier number of scanning phases of the camera system.

In accordance with another broad aspect of the present technology, there is provided an electronic device. The electronic device comprises a processor; a non-transitory computer-readable medium comprising data, the data being generated by a camera system and a LIDAR system communicatively coupled, via a communication interface, with the processor, and mounted onto a Self-Driving Vehicle (SDV). The data includes: (i) image data of the camera system mounted onto the SDV for generating the image data about a pre-determined portion of a surroundings of the SDV, the camera data being in a form of a sequence of snapshots generated by the camera system, the sequence of snapshots representing the pre-determined portion at different moments in time, and (ii) map data from a LIDAR system mounted to the SDV for generating the map data about the surroundings of the SDV including the pre-determined portion, the map data being in a form of data points generated by the LIDAR system, the data points representing objects located in different portions of the surroundings of the SDV at different moments in time. The processor is configured to cause the camera system and the LIDAR system to provide the image data and the map data in a common time referential, the common time referential being an indication of an absolute time during which the data is generated; determine a first timestamp for the map data, the first timestamp corresponding to a given moment in time in the common time referential during which the LIDAR system generated data points representing objects located in the pre-determined portion; determine a second timestamp for the image data, the second timestamps corresponding to an other given moment in time in the common time referential during which the camera system has been generating a given snapshot of the pre-determined portion; determine by the electronic device, a temporal offset between the first timestamp and the second timestamp, the temporal offset being indicative of a difference between the given moment in time and the other given moment in time in the common time referential; use the temporal offset to trigger a delay between subsequent snapshots generated by the camera system, such that (i) at least one subsequent snapshot is generated by the camera system and (ii) subsequent data points about the pre-determined portion is generated by the LIDAR system, at a same future moment in time in the common time referential.

In some implementations of the electronic device, the processor is configured to use the temporal offset during operation of the SDV.

In some implementations of the electronic device, the processor is further configured to cause the camera system to provide the image data during a first iteration of an operation of the camera system, is further configured to use the temporal offset for a subsequent operation of the camera system.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
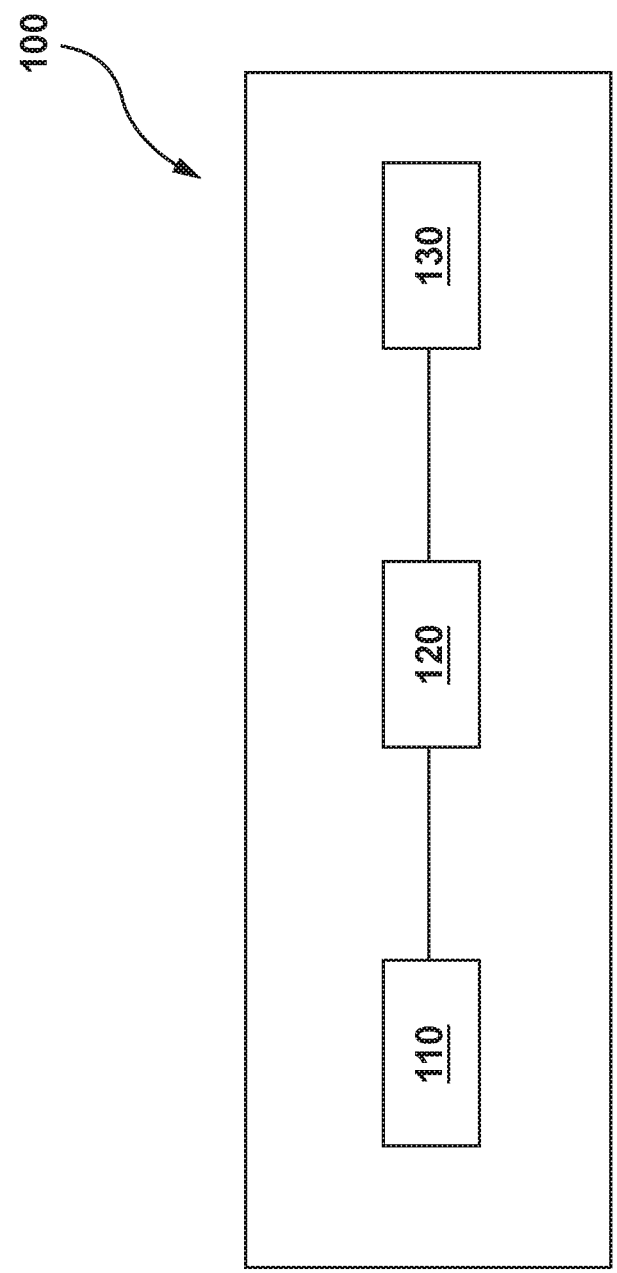
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory. Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computer Environment

Figure 2:
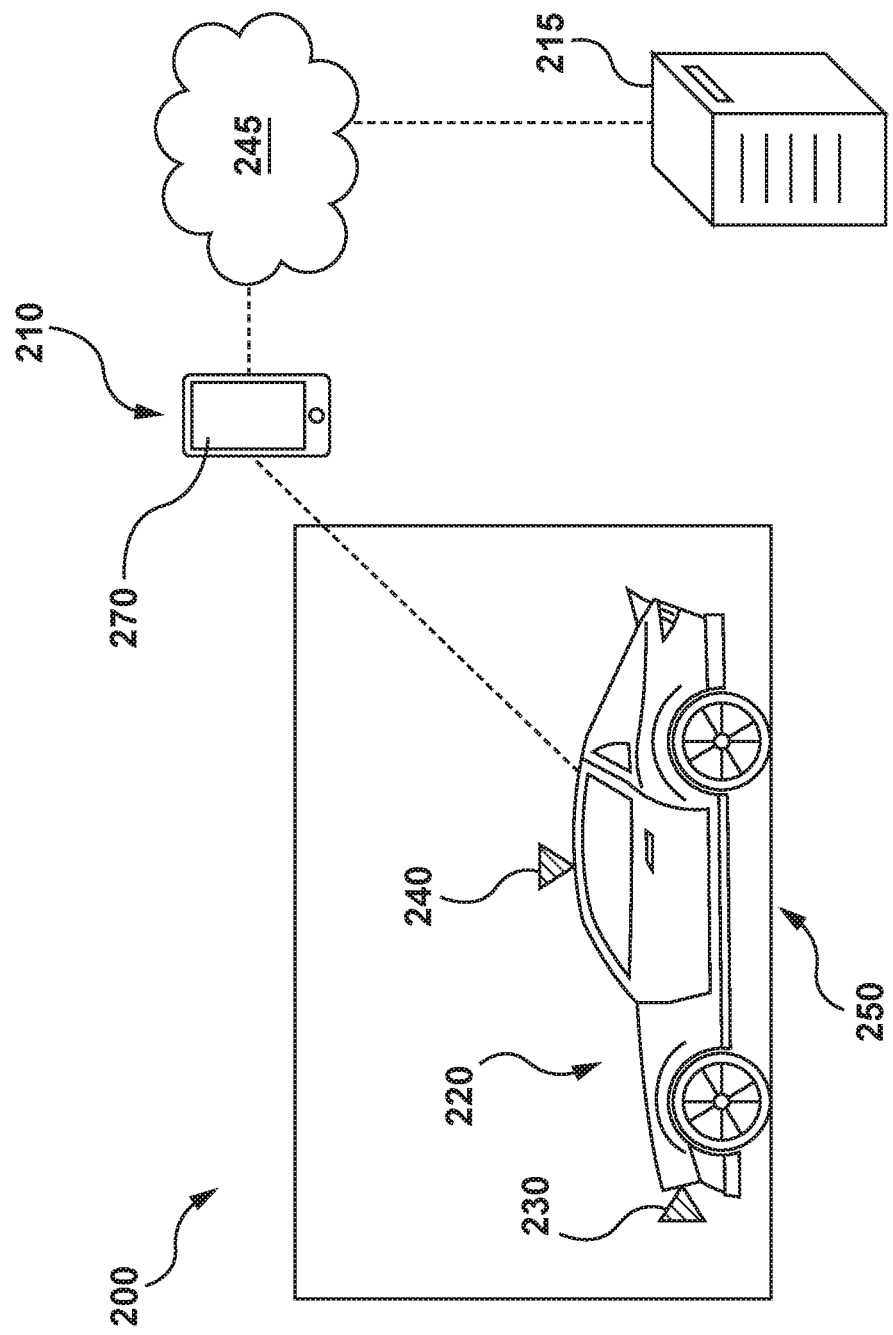
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, or associated with a user (not depicted) who can operate the vehicle 220. The networked computer environment 200 further comprises a server 215 in communication with the electronic device 210 via a communication network 245 (e.g. the Internet or the like, as will be described in greater detail herein below). Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. The vehicle may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2× or 4×), tyre type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for determining the presence of an object around the vehicle 220, as will be described in greater detail below.

In accordance with the non-limiting embodiments of the present technology, the electronic device 210 further comprises or has access to a first sensor 230. Further, the electronic device 210 may further comprise a second sensor 240. The first sensor 230 is configured to capture an image of a surrounding area 250 and the second sensor 240 is configured to capture LIDAR point cloud of the surrounding area 250 and other sensors (not depicted). The first sensor 230 and the second sensor 240 are operatively coupled to the processor 110 for transmitting the so-captured information to the processor 110 for processing thereof, as will be described in greater detail herein below.

First Sensor

In a specific non-limiting example, the first sensor 230 comprises a camera. How the camera is implemented is not particularly limited. For example, in one specific non-limiting embodiments of the present technology, the camera can be implemented as a mono camera with resolution sufficient to detect objects at pre-determined distances of up to about 30 m (although cameras with other resolutions and ranges are within the scope of the present disclosure). The camera can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the first sensor 230 can be mounted in a dedicated enclosure (not depicted) mounted on the top of the vehicle 220.

In some non-limiting embodiments of the present technology, the first sensor 230 can be implemented as a plurality of cameras. For example, the plurality of cameras may have a sufficient number of cameras to capture a surrounding/panoramic image of the surrounding areas 250.

In some non-limiting embodiments of the present technology, the camera (or one or more cameras that make up the implementation of the first sensor 230) is configured to capture a pre-determine portion of the surrounding area 250 around the vehicle 220. In some embodiments of the present technology, the camera is configured to capture an image (or a series of images) that represent approximately 90 degrees of the surrounding area 250 around the vehicle 220 that are along a movement path of the vehicle 220.

In other non-limiting embodiments of the present technology, the camera is configured to capture an image (or a series of images) that represent approximately 180 degrees of the surrounding area 250 around the vehicle 220 that are along a movement path of the vehicle 220.

In yet additional embodiments of the present technology, the camera is configured to capture an image (or a series of images) that represent approximately 360 degrees of the surrounding area 250 around the vehicle 220 that are along a movement path of the vehicle 220 (in other words, the entirety of the surrounding area around the vehicle 220).

In a specific non-limiting example, the first sensor 230 can be implemented may be of the type available from FLIR Integrated Imaging Solutions Inc., 12051 Riverside Way, Richmond, BC, V6W 1K7, Canada. It should be expressly understood that the first sensor 230 can be implemented in any other suitable equipment.

In the non-limiting embodiments of the present technology, the first sensor 230 may be configured to take snapshots with a predetermined camera scanning frequency (for example, one snapshot in 30 ms), thereby generating image data of a predetermined portion (depicted in FIG. 4) of the surrounding area 250 of the vehicle 220.

Second Sensor

In a specific non-limiting example, the second sensor 240 comprises a Light Detection and Ranging (LIDAR) instrument. LIDAR stands for LIght Detection and Ranging. It is expected that a person skilled in the art will understand the functionality of the LIDAR instrument, but briefly speaking, a transmitter (not depicted) of the second sensor 240 implemented as the LIDAR sends out a laser pulse and the light particles (photons) are scattered back to a receiver (not depicted) the second sensor 240 implemented as the LIDAR instrument. The photons that come back to the receiver are collected with a telescope and counted as a function of time. Using the speed of light (~3×10$^8$ m/s), the processor 110 can then calculate how far the photons have traveled (in the round trip). Photons can be scattered back off of many different entities surrounding the vehicle 220, such as other particles (aerosols or molecules) in the atmosphere, other card, stationary objects or potential obstructions in the surrounding area 250 of the vehicle 220. Those photons comprise so-called LIDAR point clouds and are indicative of map data generated by the second sensor 240.

In a specific non-limiting example, the second sensor 240 can be implemented as the LIDAR-based sensor that may be of the type available from Velodyne LiDAR, Inc. of 5521 Hellyer Avenue, San Jose, Calif. 95138, United States of America. It should be expressly understood that the second sensor 240 can be implemented in any other suitable equipment.

In some embodiments of the present technology, the second sensor 240 can be implemented as a plurality of LIDAR based sensor, such as three for example or any other suitable number. In some embodiments of the present technology, the second sensor 240 (whether implemented as a single LIDAR based sensor or multiple LIDAR based sensors) can be housed in the above-mentioned enclosure (not separately depicted) located on the roof of the vehicle 220.

In those embodiments of the present technology, where the second sensor 240 is implemented as multiple LIDAR based sensors housed in the enclosure (not depicted), the spatial placement of the multiple LIDAR based sensors can be designed taking into account the specific technical configuration of the multiple LIDAR based sensors, configuration of the enclosure, weather conditions of the area where the vehicle 220 is to be used (such as frequent rain, snow, and other elements) or the like.

In the non-limiting embodiments of the present technology, the second sensor 240 may be mounted onto the vehicle 220 rotating thereon with a predetermined frequency (for example, one rotational cycle in 200 ms), which is referred to herein as a predetermined LIDAR scanning frequency. As such, the second sensor 240 may be configured to generate the map data of the surrounding area 250 of the vehicle 220 with the predetermined LIDAR scanning frequency.

Other Sensors

In additional non-limiting embodiments of the present technology, the electronic device 210 may further comprise or have access to a third sensor (not depicted). The third sensor (not depicted) may comprise a RAdio Detection And Ranging (RADAR) instrument. Briefly speaking, a RADAR instrument is a detection instrument using radio waves to determine a range, angle and/or velocity of objects. The RADAR instrument includes a transmitter producing electromagnetic waves, an antenna used for transmitting and receiving electromagnetic waves, a receiver, and a processor to determine properties of the detected objects. In alternative embodiments of the present technology, there may be a separate antenna for receiving waves, and a separate antenna for transmitting waves. The processor used for determining properties of surrounding objects may be the processor 110.

In some embodiments of the present technology, the third sensor (not depicted) may comprise long-range, medium-range and short-range RADAR sensors. As a non-limiting example, the long-range RADAR sensor may be used for adaptive cruise control, automatic emergency braking, and forward collision warning, while the medium and short-range RADAR sensors may be used for park assist, cross-traffic alert, junction assist, and blind side detection.

In a specific non-limiting example, the third sensor (not depicted) may be of the type available from Robert Bosch GmbH of Robert-Bosch-Platz 1, 70839 Gerlingen, Germany. It should be expressly understood that the third sensor (not depicted) can be implemented in any other suitable equipment.

In some embodiments of the present technology, the first sensor 230 and the second sensor 240 may be calibrated such that for the image captured by the first sensor 230 and the LIDAR point cloud captured by the second sensor 240, the processor 110 is configured to identify a given region of the image that correspond to a given region of the LIDAR point cloud captured by the second sensor 240. In other embodiments of the present technology, the first sensor 230, the second sensor 240, and the third sensor (not depicted) are calibrated such that for the image captured by the first sensor 230, the LIDAR point cloud captured by the second sensor 240, and the RADAR data captured by the third sensor (not depicted), the processor 110 is configured to identify a given region of the image that correspond to a given region of the LIDAR point cloud and the RADAR data.

The third sensor (not depicted) may thus provide additional information to or enrich what is acquired by the first sensor 230 and/or second sensor 240. As a non-limiting example, it has been shown that in certain cases a RADAR sensor may perform better than a LIDAR instrument in particular weather conditions, such as fog, rain, snow, and dust. Further, a RADAR sensor may determine relative traffic speed or velocity of a moving object accurately using the Doppler frequency shift. Thus, the third sensor (not depicted) may be used in combination with the first sensor 230, in combination with the second sensor 240, or in combination with the first sensor 230 and the second sensor 240. In some embodiments of the present technology, the third sensor (not depicted) may only be used temporarily, such as in heavy weather condition, for example.

In the non-limiting embodiments of the present technology, the electronic device 210 may further comprise or have access to other sensors (not depicted). The other sensors (not depicted) include one or more of: an inertial measurement unit (IMU), a Global Navigation Satellite System (GNSS) instrument, ground speed RADARs, ultrasonic SONAR sensors, odometry sensors including accelerometers and gyroscopes, mechanical tilt sensors, magnetic compass, and other sensors allowing operation of the vehicle 220.

As a non-limiting example, the IMU may be fixed to the vehicle 220 and comprise three gyroscopes and three accelerometers for providing data on the rotational motion and linear motion of the vehicle 220, which may be used to calculate motion and position of the vehicle 220.

This calibration can be executed during the manufacturing and/or set up of the vehicle 220. Alternatively, calibration cab be executed at any suitable time thereafter or, in other words, the calibration can be executed during retrofitting the vehicle 220 with the first sensor 230, the second sensor 240, and the third sensor 236 in accordance with the non-limiting embodiments of the present technology contemplated herein. Alternatively, the calibration can be executed during equipping the vehicle 220 with the first sensor 230 and the second sensor 240, and the third sensor 236 in accordance with the non-limiting embodiments of the present technology contemplated herein.

Communication Network

In some embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend, inter alia, on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 215.

Server

In some embodiments of the present technology, the server 215 is implemented as a conventional computer server and may comprise some or all of the components of the computer system 1 of FIG. 1. In one non-limiting example, the server 112 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 215 may be distributed and may be implemented via multiple servers.

In some non-limiting embodiments of the present technology, the processor 110 of the electronic device 210 can be in communication with the server 215 to receive one or more updates. The updates can be, but are not limited to, software updates, map updates, routes updates, weather updates, and the like. In some embodiments of the present technology, the processor 110 can also be configured to transmit to the server 215 certain operational data, such as routes travelled, traffic data, performance data, and the like. Some or all data transmitted between the vehicle 220 and the server 215 may be encrypted and/or anonymized.

In the non-limiting embodiments of the present technology, the server 215 is configured to provide, via the communication network 245, the electronic device 210 with indications of absolute time, which will be described herein below with reference to FIG. 3.

Synchronization System

Figure 3:
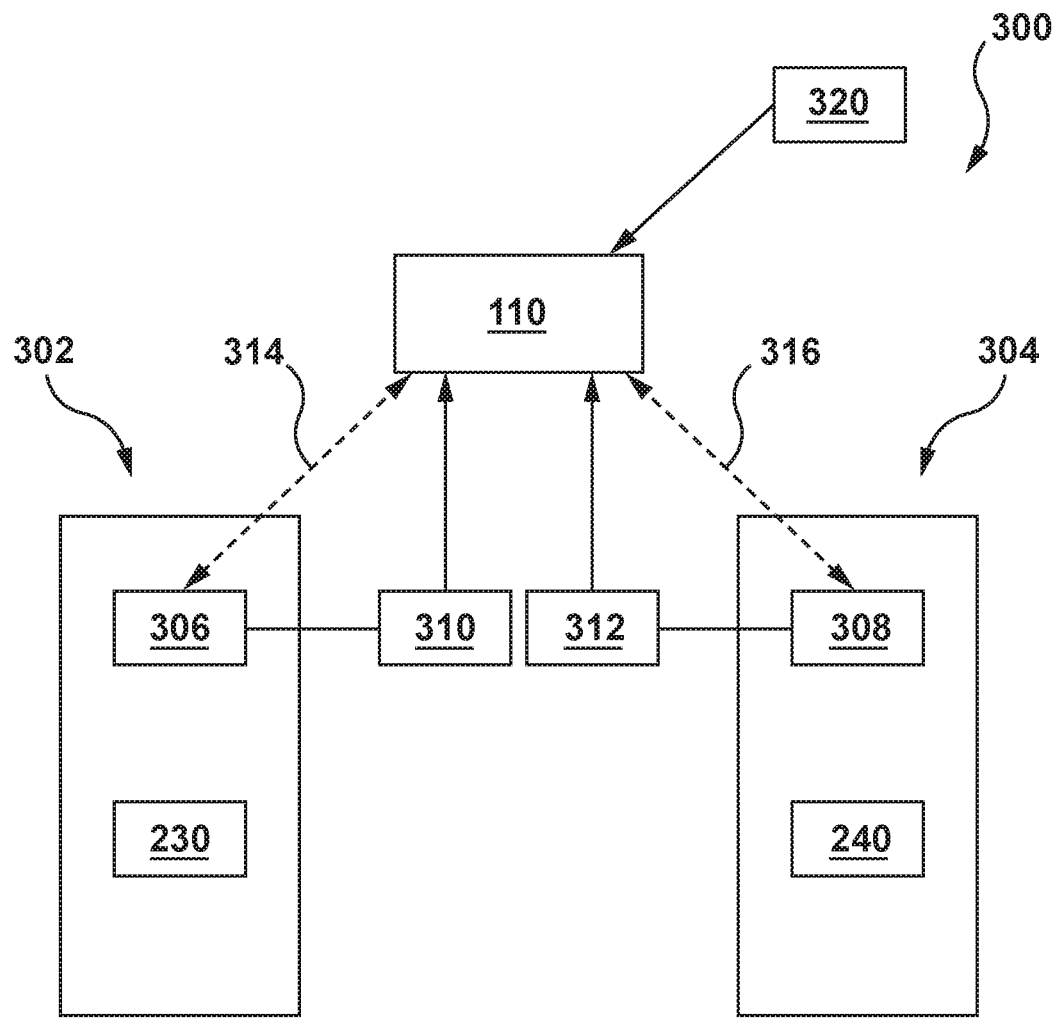
FIG. 3 depicts a schematic diagram of a synchronization system, in accordance with the non-limiting embodiments of the present technology.

Referring now to FIG. 3, there is depicted a synchronization system 300 implemented in accordance with a non-limiting embodiment of the present technology. The synchronization system 300 is configured for synchronizing the operation of the first sensor 230 and the second sensor 240, in accordance with the non-limiting embodiments of the present technology. The synchronization system 300 includes a processor (for example the processor 110 of the electronic device 210), a camera system 302 comprising the first sensor 230, and a LIDAR system 304 comprising the second sensor 240.

According to the non-limiting embodiments of the present technology, the camera system 302 may further comprise a camera synchronization component 306. The LIDAR system 304 may further comprise a LIDAR synchronization component 308.

Broadly speaking, the synchronization system 300 is configured to align, in time, capturing of an image data 310 of the predetermined portion of the surrounding area 250 generated by the camera system 302 with capturing a map data 312 representing data points of objects located in the predetermined portion, the map data that has been generated by the LIDAR system 304. To that end, in the non-limiting embodiments of the present technology, the processor 110 is configured to provide the camera system 302 and the LIDAR system 304 with a common time reference for capturing and processing data.

In this regard, as alluded to hereinabove, the processor 110 may be configured to receive, from the server 215, an indication of absolute time 320. In the non-limiting embodiments of the present technology, the absolute time is the astronomical time.

In the non-limiting embodiments of the present technology, the astronomical time is the UT1 version of Universal time. More specifically, the astronomical time is a mean solar time at 0° longitude. The astronomical time is computed from observations of distant quasars using long baseline interferometry, laser ranging of the Moon and artificial satellites, as well as the determination of GPS satellite orbits. The astronomical time, as referred to herein, is the same everywhere on the planet Earth, and is proportional to the rotation angle of the Earth with respect to distant quasars, specifically, the International Celestial Reference Frame (ICRF), neglecting some small adjustments.

In some non-limiting embodiments of the present technology, the astronomical time may further be approximated by the UTC version of Universal time (Coordinate Universal Time). In these embodiments, the astronomical time represents an atomic timescale for UT1, wherein it ticks with seconds provided by the International Atomic Time standard (TAI standard) accounting for 86,400 seconds per day with occasional introductions of a leap second.

As mentioned above, the camera system 302 includes the first sensor 230 and the camera synchronization component 306. The camera synchronization component 306 is communicatively coupled with the first sensor 230 using any compatible interface depending on the type of the camera synchronization component 306 and the type of the first sensor 230, and corresponding software (drivers). With the processor 110, the camera synchronization component 306 is communicatively coupled via a communication link 314.

In specific non-limiting embodiments of the present technology, the camera synchronization component 306 may be of the type Jetson TX2 available from NVIDIA Corporation located at 2788 San Tomas Expy, Santa Clara, Calif. 95051, the United States. It should be expressly understood that the camera synchronization component 306 can be implemented in any other suitable equipment.

Broadly speaking, the camera synchronization component 306 is configured for transmitting to the processor 110, via the communication link 314, data indicative of scanning phases of the first sensor 230. Further, the camera synchronization component 306 is configured for receiving, from the processor 110, based on the indication of the absolute time 320, an adjusted schedule for operating the first sensor 230. The schedule is generated in such a way that at least one of subsequent snapshots of the image data 310 is taken, by the first sensor 230, at a future moment in time, simultaneously with the second sensor 240 generating the map data 312 of the objects therein (i.e. to ensure that taking the subsequent snapshots of the image data 310 is coordinated in time with generating the map data 312). The scanning phases of the first sensor 230 and the generation of the schedule will be described below with reference to FIGS. 4 to 8.

In some non-limiting embodiments of the present technology, the communication link 314 may be based on the Precision Time Protocol (PTP) protocol. Briefly speaking, the PTP protocol is defined in the IEEE 1588 standard as Precision Clock Synchronization for Networked Measurements and Control Systems, and was developed to synchronize the clocks in packet-based networks that include distributed device clocks of varying precision and stability. The IEEE 1588 standards, defining the PTP protocol, describe a hierarchical master-slave architecture for distribution of common time references. Under this architecture, the components of the synchronization system 300 may be represented as either the source of ("master", the processor 110 in the synchronization system 300, for example) or destination for ("slave", the camera synchronization component 306, for example) a synchronization reference (the indication of the absolute time 320). The PTP protocol is based on the TAI time standard, as such, the UTC time can be computed from the time received by the PTP grandmaster (the root source) time. Accordingly, on a local area network, the PTP protocol may achieve clock accuracy in the sub-microsecond range.

In other non-limiting embodiments of the present technology, the communication link 314 may be based on the Network Time Protocol (NTP) protocol. Briefly speaking, the NTP protocol is a protocol used to synchronize computer clock times in a network that typically uses a server-client architecture. An NTP client initiates a time-request exchange with the NTP server. As a result of this exchange, the client is able to calculate the link delay and its local offset, and adjust its local clock to match the clock at the server's computer. The NTP protocol uses the UTC to synchronize computer clock times with, and as such, a synchronization accuracy of less than 1 millisecond, in a local area network, and that over the Internet, of within tens of milliseconds may be achieved.

In the non-limiting embodiments of the present technology, the LIDAR synchronization component 308 is configured to transmit to the processor 110, via a communication link 316, data indicative of moments in time and respective angular positions of the second sensor 240 at a given cycle. Subsequently, the LIDAR synchronization component 308 is configured to receive, from the processor 110, LIDAR timestamps generated based on the indication of absolute time 320 for subsequent cycles of operation of the second sensor 240. Each of the LIDAR timestamps corresponds to future moments in time when the second sensor 240 is at a predetermined angular position for generating the map data 312 of objects located in the predetermined portion of the surrounding area 250. How the LIDAR system 304 is configured to generate the map data 312 and how the processor 110 is configured to generate the LIDAR timestamps will be further described with reference to FIGS. 4 and 6.

According to the non-limiting embodiments of the present technology, the communication link 316 may be based on the PTP protocol described hereinabove.

Broadly speaking, in the non-limiting embodiments of the present technology, the LIDAR synchronization component 308 may be implemented as a separate board including a microcontroller (not depicted). The microcontroller (not depicted) is connected to the processor 110 via the communication link 316 as described above using the Ethernet interface, for example. The microcontroller (not depicted) is further connected to the second sensor 240 using the Universal Asynchronous Receiver-Transmitter (UART) interface and Pulse-per-Second (PPS) signals generated accurately once per second. This allows the LIDAR synchronization component 308 to transmit the LIDAR timestamps received from the processor 110, thereby operating the second sensor 240 in the common time reference as will be described in greater detail below with reference to FIGS. 4 to 8.

Figure 4:
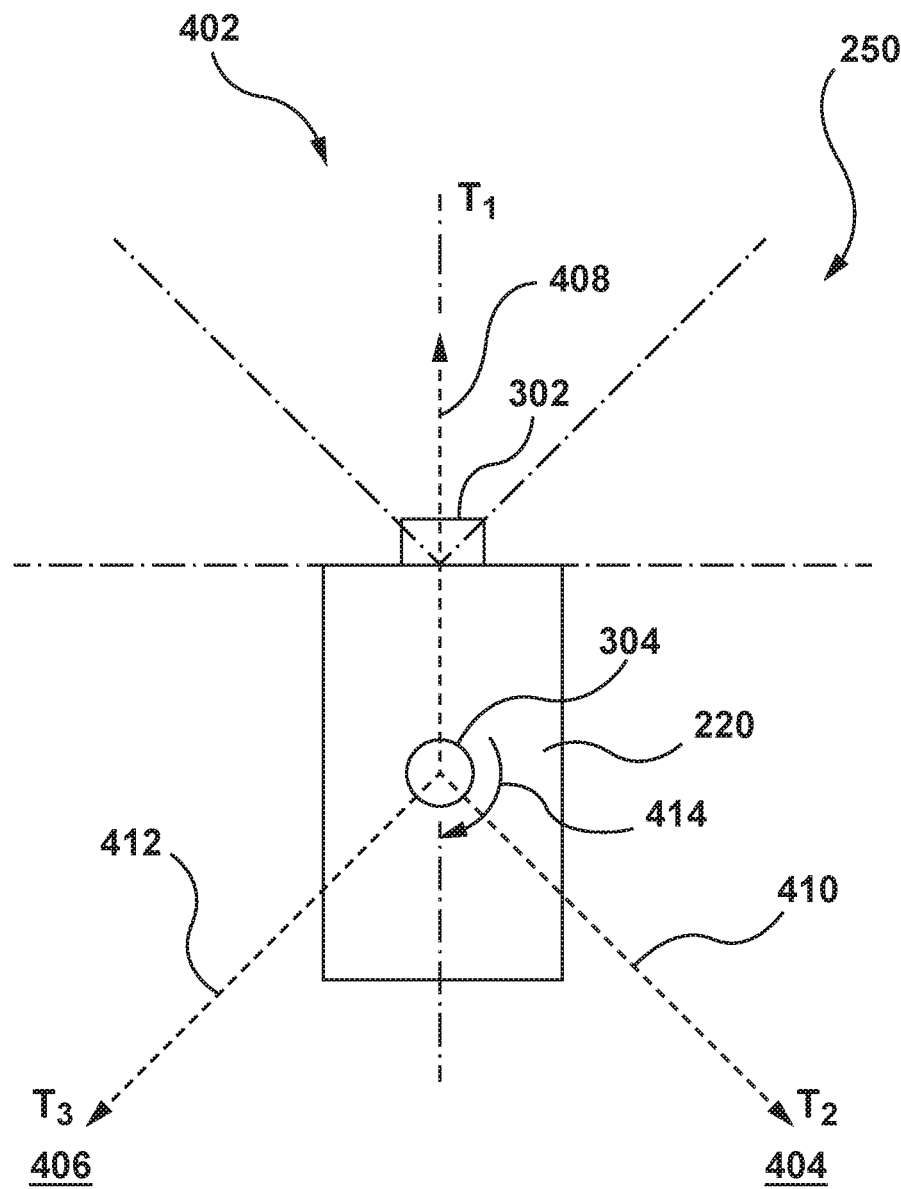
FIG. 4 depicts a schematic diagram of a top view of a vehicle of the networked computing environment of FIG. 2, in accordance with the non-limiting embodiments of the present technology.

Now, with reference to FIG. 4, there is schematically depicted a top view of the vehicle 220 including the camera system 302 and the LIDAR system 304 mounted thereon, according to the non-limiting embodiments of the present technology. In the embodiments of FIG. 4, the camera system 302 is rigidly mounted on the vehicle 220 in such a way that the first sensor 230 is directed at the predetermined portion 402 of the surrounding area 250. To put it another way, the first sensor 230 has a field of view that coincides with the predetermined portion 402 of the surrounding area 250. To that end, the camera system 302 is configured to capture, using the first sensor 230, the image data 310 of the predetermined portion 402 of the surrounding area 250 in different moments in time.

In the non-limiting embodiments of the present technology, the LIDAR system 304 mounted on the top of the vehicle 220, and operating concurrently with the camera system 302, may be a rotational LIDAR system. To that end, the second sensor 240 rotates in the direction 414 around its central vertical axis. Accordingly, the LIDAR system 304 may be configured to generate, by using the second sensor 240, the map data of objects located in the surrounding area 250 of the vehicle 220. In order to receive both the image data 310 and the map data 312 of the predetermined portion 402 simultaneously, the processor 110 may be configured to synchronize operation of the camera system 302 and the LIDAR system 304 based on the indication of absolute time 320 received from the server 215. How the synchronization is implemented will be described below with reference to FIGS. 7 to 8.

Figure 5:
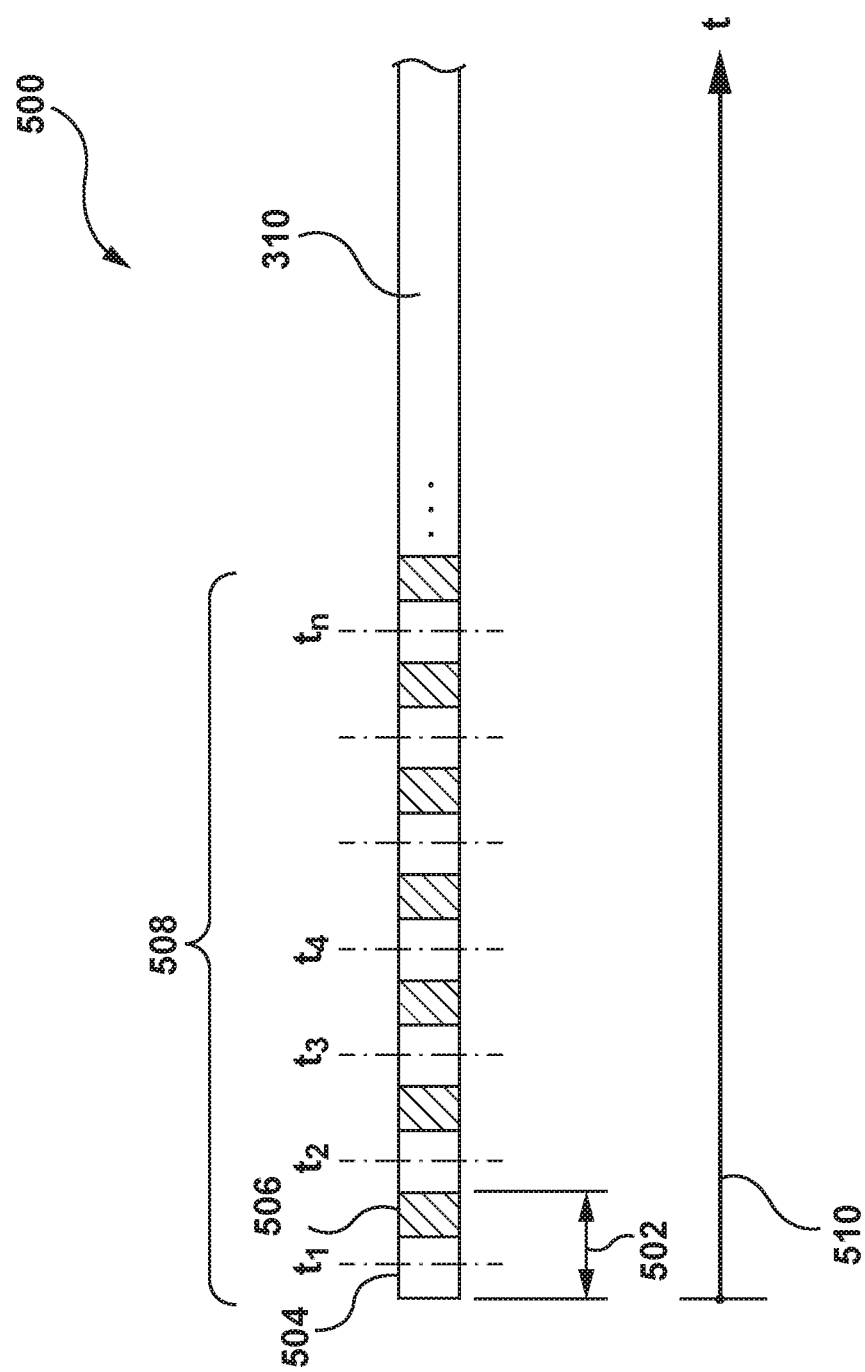
FIG. 5 depicts a time diagram of operating, by a processor of the computer system of FIG. 1, a camera system of the networked computing environment of FIG. 2, in accordance with the non-limiting embodiments of the present technology.

Now, reference will be made to FIGS. 4 and 5. In FIG. 5, there is depicted a time diagram 500 of operating, by the processor 110, the first sensor 230 of the camera system 302, according to the non-limiting embodiments of the present technology. The first sensor 230 is configured, by the processor 110, to operate in scanning phases; in each scanning phase, the first sensor 230 is taking a respective snapshot of the predetermined portion 402, thereby generating the image data 310 that includes a plurality of snapshots of the predetermined portion 402.

A scanning phase 502 of the first sensor 230 includes a shooting phase 504 and a gap phase 506. A duration of the scanning phase 502 depends on an operation frequency of the first sensor 230 that may be, for example, one snapshot of the predetermined portion 402 in 30 ms. The shooting phase 504 is a phase where the first sensor 230 is taking a given snapshot of the predetermined portion 402. The gap phase 506 is a phase where the first sensor 230 is preparing for taking a next snapshot of the predetermined portion 402. How the scanning phase 502 is split onto the shooting phase 504 and the gap phase 506 is not limited, and as such, the duration thereof may be pre-determined by a specific configuration of the first sensor 230.

In the non-limiting embodiments of the present technology, the duration of the gap phase 506 may be modified (increased, for example), which will cause a respective change in the duration of the scanning phase 502.

Referring to FIGS. 3 and 5, in the non-limiting embodiments of the present technology, the camera synchronization component 306 of the camera system 302 may be configured to receive, from the first sensor 230, data indicative of a start and an end of the shooting phase 504. Further, the camera synchronization component 306 may be configured to transmit the received data to the processor 110. Accordingly, the processor 110, based on the common time reference 510 received from the server 215, may be configured to generate camera timestamps 508 for subsequent scanning phases of the first sensor 230 and to transmit data indicative thereof back to the camera synchronization component 306. By so doing, the processor 110 is configured to cause the camera system 302 to generate the image data 310 of the predetermined portion 402 in the common time reference 510.

In some non-limiting embodiments of the present technology, each of the camera timestamps 508 may be selected as a midpoint of the respective shooting phase. For example, a camera timestamp $t_1$ of the camera timestamps 508 is selected as a midpoint of the shooting phase 504. In the non-limiting embodiments of the present technology, the first sensor 230 is configured to generate each snapshot of the image data 310, at the shooting phase 504, by pixel lines: line by line, from top to bottom. As such, the midpoint of the shooting phase 504 may be calculated, by the processor 110, to correspond to a moment in time when the first sensor 230 has scanned a half of pixel lines of the respective snapshot of the image data 310.

However, a fashion of selecting, by the processor 110, the camera timestamps 508 is not limited, and in other non-limiting embodiments of the present technology, may include selecting a given camera timestamp at the beginning of a respective shooting phase or at the end thereof.

Figure 6:
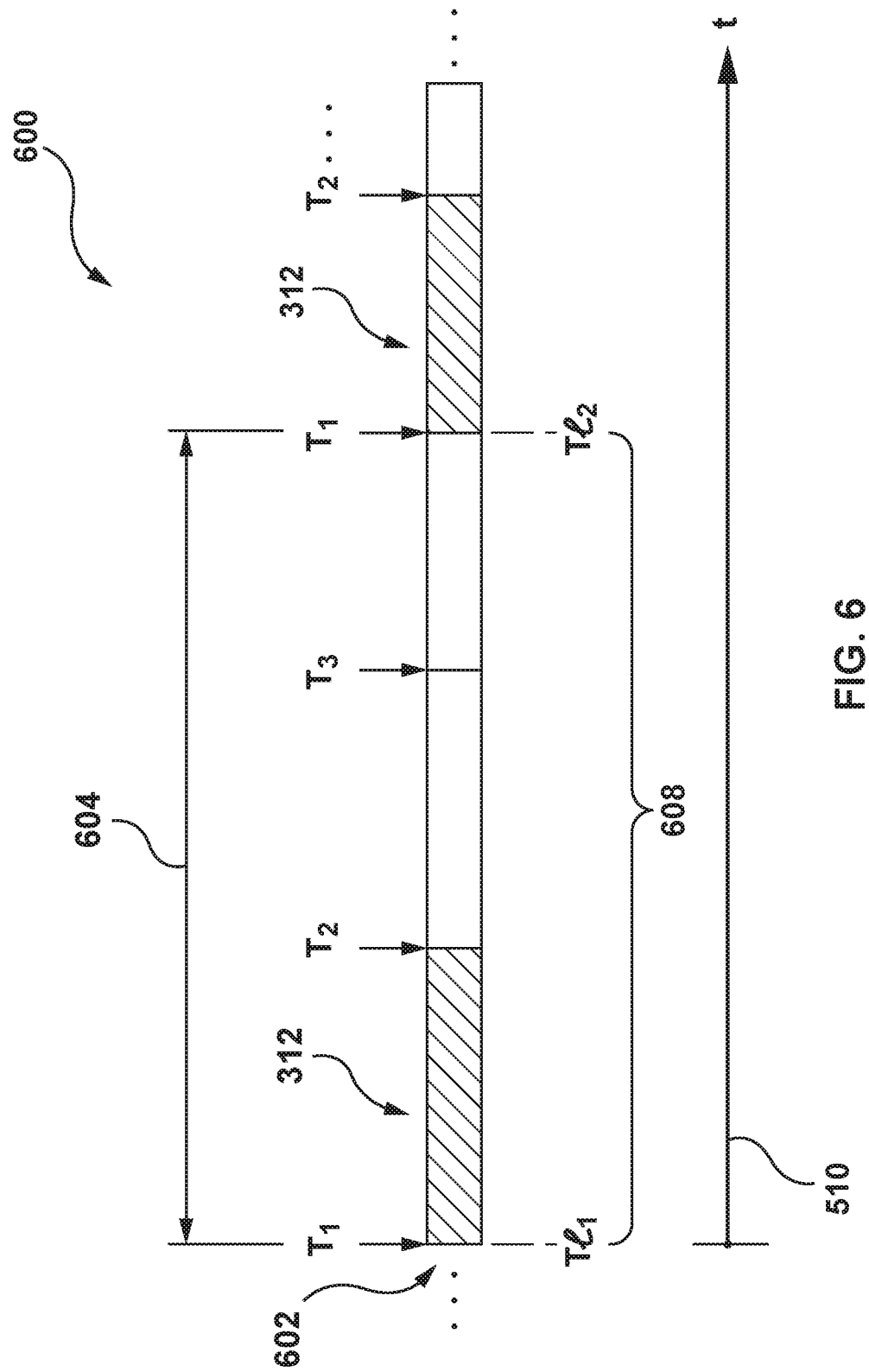
FIG. 6 depicts a time diagram of operating, by the processor of the computer system of FIG. 1, a LIDAR system of the networked computing environment of FIG. 2, in accordance with the non-limiting embodiments of the present technology.

Now, reference will be made to FIGS. 4 and 6. In FIG. 6, there is depicted a time diagram 600 of operating, by the processor 110, the second sensor 240 of the LIDAR system 304, according to the non-limiting embodiments of the present technology. The second sensor 240 is configured to generate the map data 602 of the surrounding area 250 of the vehicle 220 in rotational cycles. One rotational cycle (a rotational cycle 604, for example) may be, for example, 200 ms. The rotational cycle 604 corresponds to a time of a full, 360-degree revolution of the second sensor 240 around its central vertical axis, which may be pre-determined by a configuration of the second sensor 240. To that end, at each moment in time within the rotational cycle 604, the second sensor 240 has a different respective angular position, whereat the second sensor 240 is configured to generate map data of objects located in respective portions of the surrounding area 250 of the vehicle 220.

Thus, in the embodiments of FIGS. 4 and 6, there are depicted three angular positions of the second sensor 240 corresponding to three respective moments in time within the rotational cycle 604 of the second sensor 240: a first angular position 408 at a first moment in time $T_1$, a second angular position 410 at a second moment in time $T_2$, and a third angular position at a third moment in time $T_3$. In this regard, the sensor 234, at the first angular position 408, is configured to generate the map data 312 of the objects located in the predetermined portion 402 at the first moment in time $T_1$. At the second angular position 410 corresponding to the second moment in time $T_2$, the second sensor 240 is configured to generate the map data (not depicted) of objects located in a second portion 404 of the surrounding area 250. Finally, at the third angular position 412 corresponding to the third moment in time $T_3$, the second sensor 240 is configured to generate the map data (not depicted) of objects located in a third portion 406 of the surrounding area 250.

Referring also to FIG. 3, according to the non-limiting embodiments of the present technology, the LIDAR synchronization component 308 is configured, by the processor 110, to record, at each of the moments in time $T_1$, $T_2$, and $T_3$, data indicative of the first angular position 408, the second angular position 410, and the third angular position 412, respectively. Further, the LIDAR synchronization component 308 is configured to transmit the recorded data indicative of the angular positions of the second sensor 240 to the processor 110. The processor 110, based on the common time reference 510, is configured to generate LIDAR timestamps 608 for subsequent rotational cycles of the second sensor 240, and transmit back the indication thereof to the LIDAR synchronization component 308. Each of the LIDAR timestamps 608 corresponds to a respective moment in time within a rotational cycle of the second sensor 240, when the second sensor 240 is at the first angular position 408. For example, a LIDAR timestamp $Tl_2$ of the LIDAR timestamps 608 corresponds to the first angular position of the second sensor 240 on a rotational cycle subsequent to the rotational cycle 604. By so doing, the processor 110 is configured to cause the LIDAR system 304 to generate the map data 312 of the predetermined portion 402 in the common time reference 510.

It should be expressly understood that the first angular position 408, the second angular position 410, and the third angular position 412 of the second sensor 240 are depicted, in FIG. 4 merely as an aid in understanding the present technology; and, in the non-limiting embodiments of the present technology, the LIDAR synchronization component 308 may be configured to record and transmit data indicative of more than three angular positions of the second sensor 240, a number of which can be hundreds, thousands, or even hundreds of thousands.

Having generated the camera timestamps 508 and the LIDAR timestamps 608 based on the common time reference 510, the processor 110 may further be configured to synchronize the scanning phases of the camera system 302 and at least one subsequent rotational cycle of the LIDAR system 304.

Figure 7:
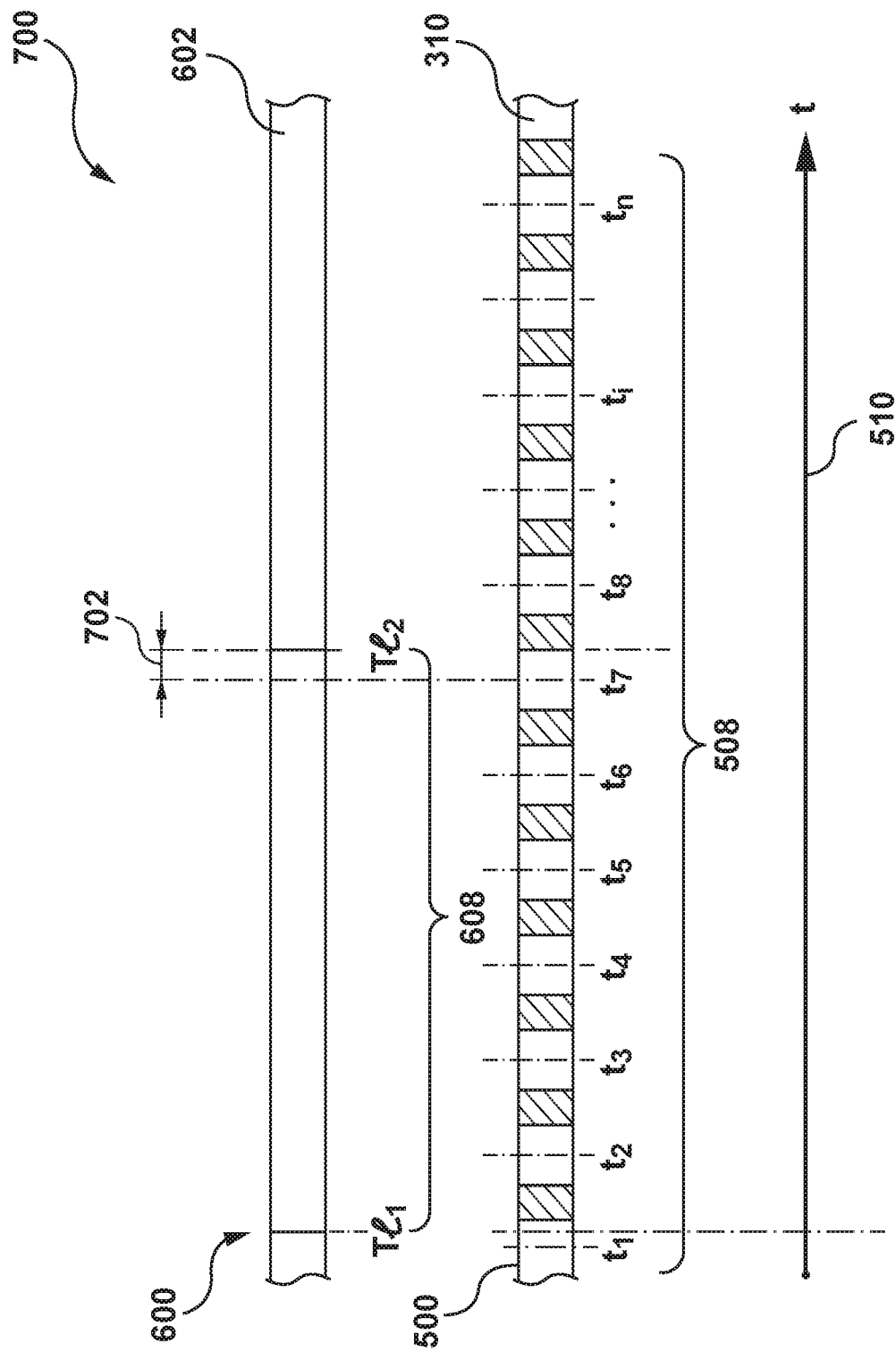
FIG. 7 depicts a combined time diagram of operating, by the processor of the computer system of FIG. 1, the camera system of the networked computing environment of FIG. 2 and the LIDAR system of the networked computing environment of FIG. 2 before synchronization thereof, in accordance with the non-limiting embodiments of the present technology.

With reference to FIG. 7, there is depicted a combined time diagram 700 including the time diagram 600 of the LIDAR system 304 and the time diagram 500 of the camera system 302. According to the time diagram 700, the camera system 302 is configured to generate each snapshot of the image data 310 at a respective one of the camera timestamps 508; and the LIDAR system 304 is configured to generate the map data 312 of the objects located in the predetermined portion 402 at a respective one of the LIDAR timestamps 608. Thus, both the camera system 302 and the LIDAR system 304 are caused, by the processor 110, to provide the image data 310 and the map data 312 in the common time reference 510.

Let it be assumed that in the embodiments of FIG. 7, a camera timestamp $t_1$ of the camera timestamps 508 corresponds to a current scanning phase of the camera system 302. As it can be appreciated from the time diagram 700, the scanning phases of the camera system 302 and the rotational cycles of the LIDAR system 304 are desynchronized as the camera timestamp $t_1$ of the camera timestamps 508 does not coincide with a LIDAR timestamp $Tl_1$ of the LIDAR timestamps 608. Accordingly, the processor 110 may be configured to synchronize an immediately following LIDAR timestamp $Tl_2$ of the LIDAR timestamps 608 with a closest thereto subsequent one of the camera timestamps 508—for example, a camera timestamp $t_7$. In other words, the processor 110 may be configured to determine a LIDAR timestamp for the synchronization as a closest LIDAR timestamp corresponding to a moment in time when the second sensor 240 is at the first angular position 408. To that end, in the non-limiting embodiments of the present technology, the processor 110 may also be configured to have been received, from the LIDAR synchronization component 308, an indication of the first angular position 408.

In some non-limiting embodiments of the present technology, the processor 110 may be configured to apply a timestamp determination algorithm for determining a LIDAR timestamp for synchronization.

First, according to the non-limiting embodiments of the present technology, the processor 110 is configured to determine a temporal offset 702 between the camera timestamp $t_7$ and the LIDAR timestamp $Tl_2$ in the common time reference 510. Second, having determined the temporal offset 702, the processor 110 is configured to use it to trigger a delay between subsequent snapshots of the image data 310 such that the camera timestamp $t_7$ and the LIDAR timestamp $Tl_2$ would coincide in a future moment in time, thereby generating the adjusted schedule for operating the first sensor 230.

In some non-limiting embodiments of the present technology, the processor 110 is configured to use the temporal offset 702 in real time, while the vehicle 220 is moving. In other non-limiting embodiments of the present technology, the processor 110 is configured to use the temporal offset 702 while the vehicle 220 is non-moving (i.e. stopped, parked, or the like).

Figure 8:
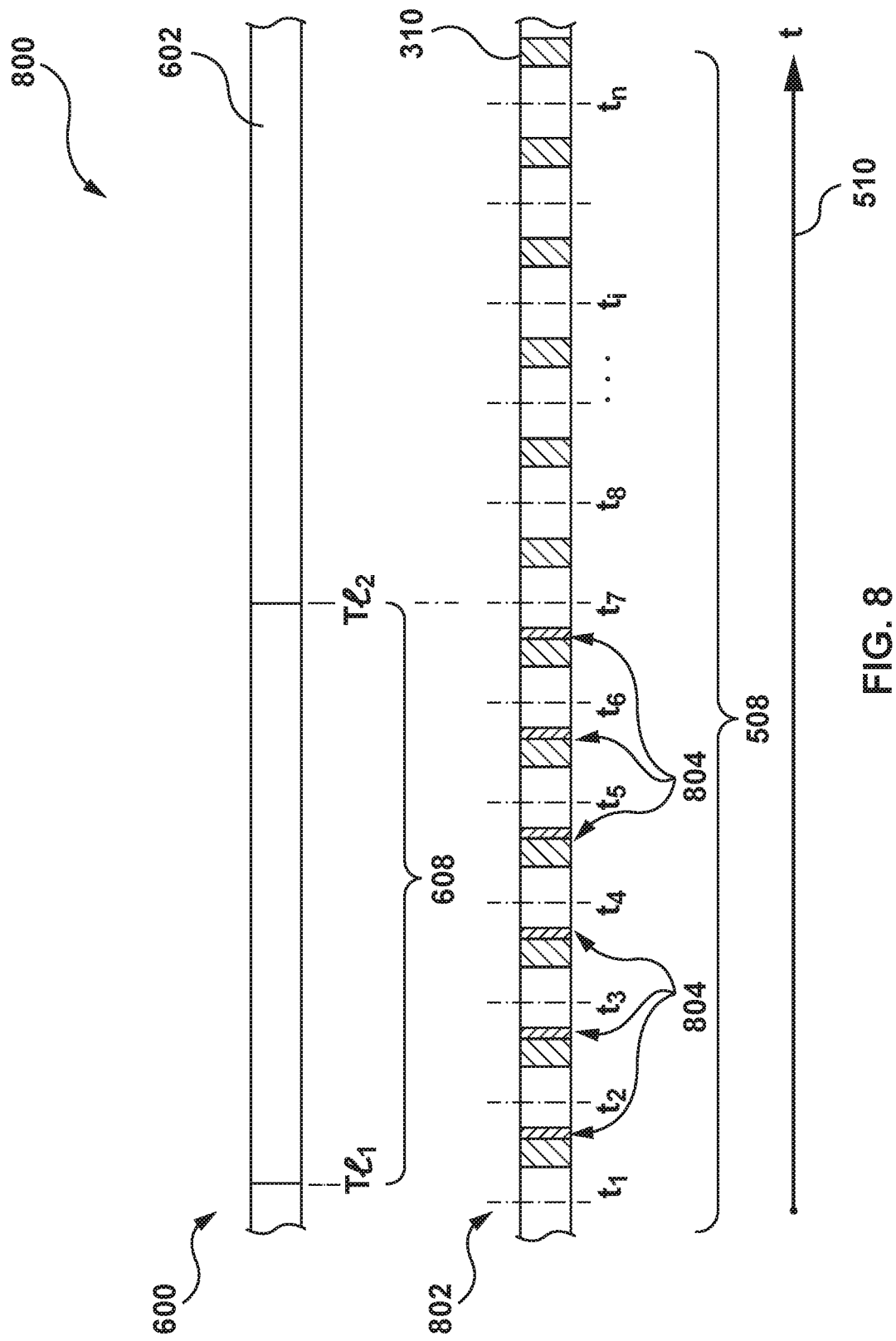
FIG. 8 depicts a combined time diagram of operating, by the processor of the computer system of FIG. 1, the camera system of the networked computing environment of FIG. 2 and the LIDAR system of the networked computing environment of FIG. 2 after the synchronization thereof, in accordance with the non-limiting embodiments of the present technology.

With reference to FIG. 8, there is depicted a time diagram 800 of operating the camera system 302 and the LIDAR system 304 in the common time reference 510. The time diagram 800 differs from the time diagram 700 only in that the time diagram 500 of operating the camera system 302 has been replaced with a time diagram 802.

In some non-limiting embodiments of the present technology, the processor 110 may be configured to use the temporal offset 702 by equally dividing it amongst all scanning phases of the camera system 302 preceding the LIDAR timestamp, by which the processor 110 is configured to perform the synchronization, i.e., in the embodiments of FIG. 8, the LIDAR timestamp $Tl_2$. Therefore, as it can be appreciated from the time diagram 802, the processor 110 may be configured to increase gap phases of the respective scanning phases corresponding to camera timestamps $t_1$, $t_2$, $t_3$, $t_4$, $t_5$, and $t_6$ of the camera timestamps 508 by a time delay 804, where the time delay 804 is one sixth of the temporal offset 702.

Thus, in those non-limiting embodiments of the present technology where the rotational cycle of the second sensor 240 is equal to a predetermined multiplier number of the scanning phases of the first sensor 230, the processor 110 is configured to use the temporal offset 702 by equally spreading it amongst the predetermined multiplier number of subsequent scanning phases of the first sensor 230 preceding the LIDAR timestamp $Tl_2$ in the common time reference 510.

Thus, by adding the time delay 804 to all the scanning phases, preceding to the LIDAR timestamp $Tl_2$ in the common time reference 510, of the camera system 302, the processor 110 is configured to shift the camera timestamp $t_7$ in such a way that it would coincides with the LIDAR timestamp $Tl_2$.

In other non-limiting embodiments of the present technology, the processor 110 is configured to use the temporal offset 702 to trigger a delay only between two given consecutive snapshots of the image data 310. To that end, the processor 110 may be configured to increase a gap phase of only one scanning phase corresponding to a respective one of the camera timestamps 508 preceding the LIDAR timestamp Tl2 in the common time reference 510.

In some non-limiting embodiments of the present technology, the processor 110 may be configured to use the temporal offset 702 for triggering the delay between subsequent snapshots of the image data 310 by implementing a frame-level delay that can be inserted between an end of the readout of the last row and the start of the reset of the first row of the next frame. This is typically referred to as the horizontal blanking period in camera manufacturer data sheets.

Where such option is not available, in some non-limiting embodiments of the present technology, the processor 110 may be configured to use the temporal offset 702 for triggering the delay between subsequent snapshots of the image data 310 by causing the camera synchronization component 306 to generate a respective electrical signal at moments in time corresponding to respective ones of the plurality of the camera timestamps 508. Accordingly, the first sensor 230 is configured to take a subsequent snapshot of the image data 310 at the respective electrical signal generated by the camera synchronization component 306. In some non-limiting embodiments of the present technology, the causing the camera synchronization component 306 to generate the respective electrical signal is executed using Frame Synchronization IN (FSIN).

Referring back to FIG. 3, having modified the scanning phases of the camera system 302 preceding the LIDAR timestamp $Tl_2$ in the common time reference 510, the processor 110 is configured to transmit the modified scanning phases, i.e. the adjusted schedule, to the camera synchronization component 306 of the camera system 302 for operating the first sensor 230, thereby modifying its predetermined camera scanning frequency. Thus, the camera system 302 would generate at least one subsequent snapshot of the image data 310 (the one corresponding to the camera timestamp $t_7$), and the LIDAR system 304 would generate the map data 312 of the objects located in the predetermined portion 402 at a same future moment in time, based on the common time reference 510.

In some non-limiting embodiments of the present technology, the processor 110 may further be configured to repeat the synchronization procedure described above with reference to FIGS. 4 to 8 with some periodicity. For example, the processor 110 may be configured to repeat the synchronization procedure for each subsequent rotational cycle of the second sensor 240, i.e. synchronizing at least one subsequent of the camera timestamps 508 with each subsequent of the LIDAR timestamps 608. In other words, the synchronization of the image data 310 and the map data 312 may be performed substantially continuously during the operation of the vehicle 220, i.e. on each subsequent future rotational cycle of the second sensor 240.

In other non-limiting embodiments of the present technology, the processor 110 may be configured to repeat the synchronization procedure after a predetermined number of rotational cycles of the second sensor 240.

In some non-limiting embodiments of the present technology, the so-determined temporal offset 702 is used for a single rotational cycle of the second sensor 240. In other non-limiting embodiments of the present technology, the so-determined temporal offset 702 is used for a pre-determined number of future rotational cycles of the second sensor 240. Accordingly, the processor 110 may be configured, at a subsequent rotational cycle of the second sensor 240, to recalculate the temporal offset 702 in real time, during the operation of the vehicle 220, following the above description in respect of FIGS. 6 to 8 iteratively.

Thus, in the non-limiting embodiments of the present technology, having caused the camera system 302 to provide the image data 310 in the common time reference 510 at a given scanning phase (the scanning phase corresponding to the timestamp $t_1$ of the camera timestamps 508, for example) and calculated the temporal offset 702, the processor 110 is configured to use it at least for a predetermined number of subsequent scanning phases of the camera system 302 (for example, five (5) subsequent scanning phases as depicted in the embodiments of FIGS. 7 and 8) for synchronization only within a single subsequent rotational cycle of the second sensor 240 (the rotational cycle corresponding to the LIDAR timestamp $Tl_2$ of the LIDAR timestamps 608, for example).

In other non-limiting embodiments, the processor 110 is configured to use the temporal offset 702 for an additional predetermined number of scanning phases of the camera system 302 for synchronization within more than the single subsequent rotational cycle of the second sensor 240.

Figure 9:
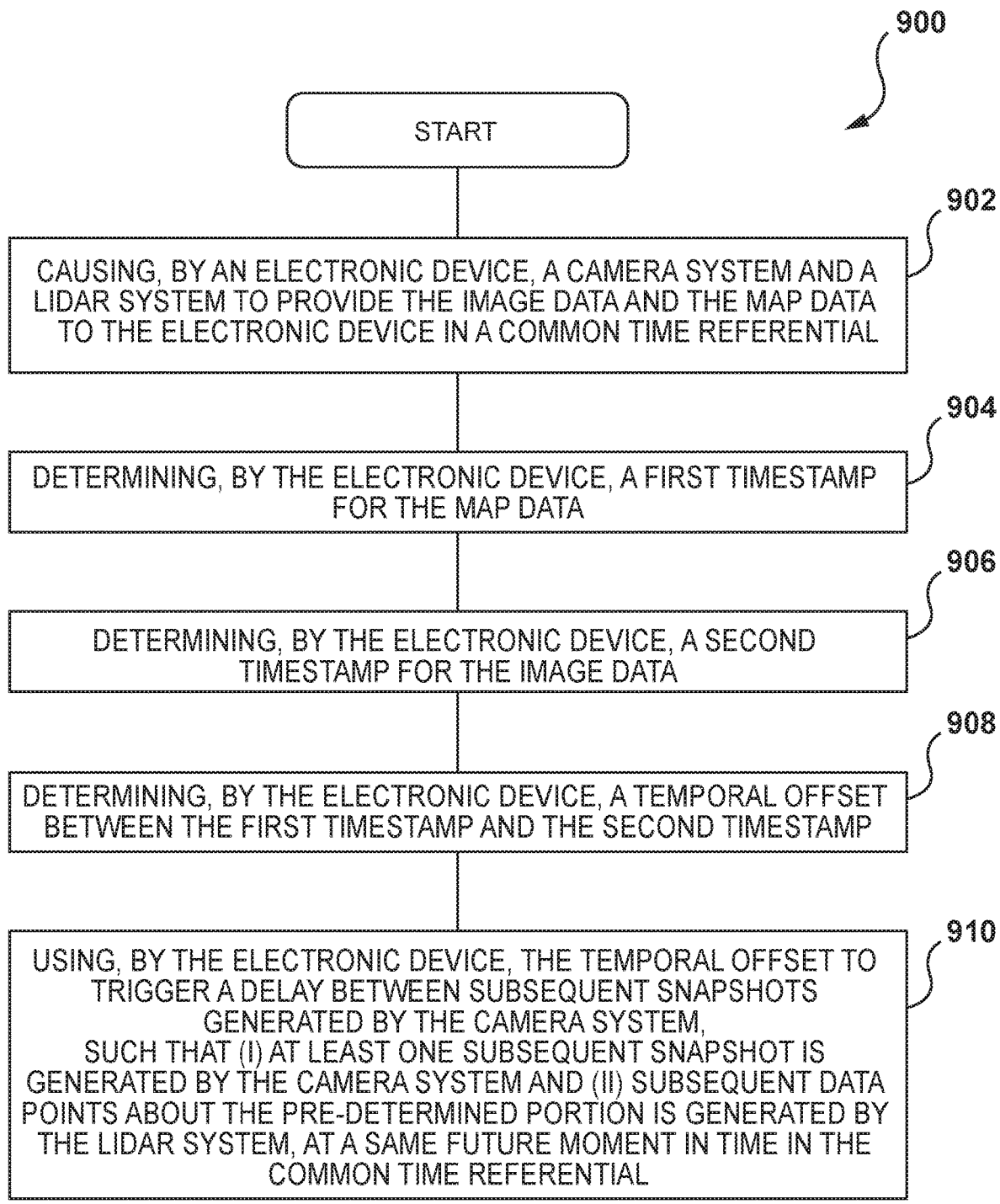
FIG. 9 depicts a flowchart diagram of a method for synchronizing data for operating of the vehicle of the networked computing environment of FIG. 2, according to the non-limiting embodiments of the present technology.

Given the architecture and the examples provided hereinabove, it is possible to execute a method of synchronizing data for operating an SDV (the vehicle 220, for example). With reference now to FIG. 9, there is depicted a flowchart of a method 900, according to the non-limiting embodiments of the present technology. The method 900 is executable by the processor 110. The processor 110 may, for example, be part of the electronic device 210.

In the non-limiting embodiments of the present technology, the processor 110 is communicatively coupled to a camera system and a LIDAR system (for example, the camera system 302 and the LIDAR system 304 depicted in FIG. 3) both mounted on the vehicle 220. The camera system 302 includes the first sensor 230 and the camera synchronization component 306. The LIDAR system 304 includes the second sensor 240 and the LIDAR synchronization component 308.

The camera system 302 is configured to capture, by the first sensor 230, the image data 310 of the predetermined portion 402 of the surrounding area 250 of the vehicle 220. The image data 310 comprises a sequence of snapshots, generated by the first sensor 230, of the predetermined portion 402 at different moments in time with the predetermined camera scanning frequency. As such, in some non-limiting embodiments of the present technology, the first sensor 230 of the camera system 302 has a field of view that coincides with the predetermined portion 402 when the camera system 302 is mounted onto the vehicle 220.

As described in detail with reference to FIGS. 4 and 5, the camera system 302 is configured to operate in scanning phases, whose duration is indicative of the predetermined camera scanning frequency. Each scanning phase has a shooting phase and a gap phase (for example, the scanning phase 502 includes the shooting phase 504 and the gap phase 506). In the shooting phase 504, the camera system 302 is configured to generate a given snapshot of the image data 310. In the gap phase 506, the camera system 302 is being in a standby mode (i.e. not taking snapshots) to prepare for taking a subsequent snapshot. Both the shooting phase 504 and the gap phase 506 can be predetermined by a specific configuration of the camera system 302. In some non-limiting embodiments of the present technology, the gap phase 506 can be modified (increased, for example).

The LIDAR system 304 is configured to generate, by the second sensor 240, the map data of the surrounding area 250 of the vehicle 220. The map data of the surrounding area 250 of the vehicle 220 comprises data points generated by the second sensor 240. The data points represent objects located in the surrounding area 250 of the vehicle 220 at different moments in time. The map data of the surrounding area 250 includes the map data 312 of the predetermined portion 402.

In some non-limiting embodiments of the present technology, the LIDAR system 304 can be a rotational LIDAR system. In this regard, the LIDAR system 304 is configured to generate the map data of the surrounding area 250 of the vehicle 220 in rotational cycles, where each rotational cycle corresponds to a full, 360-degree revolution of the second sensor 240 about its central vertical axis, for example in the direction 414 as depicted in FIG. 4. As such, the LIDAR system 304 is configured, at each angular position of the second sensor 240, to generate map data of objects located in a corresponding portion of the surrounding area 250 of the vehicle 220.

As described with reference to FIGS. 4 and 6, in the non-limiting embodiments of the present technology, the LIDAR system 304 is configured to generate the map data 312 of the objects located in the predetermined portion 402 of the surrounding area 250 when the second sensor 240 is at the first angular position 408.

Step 902—Causing, by an Electronic Device, a Camera System and a Lidar System to Provide the Image Data and the Map Data to the Electronic Device in a Common Time Referential At step 902, the processor 110 is configured to cause the camera system 302 and the LIDAR system 304 to provide the image data 310 of the predetermined portion 402 and the map data 312 of the objects located in the predetermined portion in a common time reference, the common time reference 510, for example.

To that end, first, the processor 110 is configured to receive an indication of absolute time (for example, the indication of absolute time 320 received form the server 215). As described in detail above with reference to FIG. 3, the indication of absolute time 320 can be an indication of the astronomical time.

Second, as described in detail above with reference to FIGS. 3 and 5, the camera synchronization component 306 of the camera system 302 is configured to register data indicative of the start and the end of the shooting phase 504 of the scanning phase 502 and transmit that data, via the communication link 314, to the processor 110. Further, the processor 110 is configured, based on the received data, to generate the camera timestamps 508 in the common time reference 510 for subsequent scanning phases. Finally, the processor 110 is configured to transmit, via the communication link 314, data indicative of the generated camera timestamps 508 back to the camera synchronization component 306.

In some non-limiting embodiments of the present technology, each of the camera timestamps 508 may be calculated, by the processor, as a midpoint of the shooting phase 504, as described in detail above with reference to FIG. 5.

With regard to the LIDAR system 304, first, the LIDAR synchronization component 308 is configured to register data indicative of a plurality of angular positions of the second sensor 240 and respective moments in time within one rotational cycle (the rotational cycle 604 as depicted in FIG. 6, for example). Second, as described in detail with reference to FIGS. 3, 4, and 6, the LIDAR synchronization component 308 is configured to transmit that data, via the communication link 316, to the processor 110. In response, the processor 110, based on the transmitted data, is configured to generate a plurality of LIDAR timestamps 608 in the common time reference 510. Each of the plurality of LIDAR timestamps 608 corresponds to a future moment in time when the second sensor 240 will be at the first angular position 408 on a subsequent rotational cycle of the second sensor 240. In other words, each of the plurality of LIDAR timestamps 608 corresponds to a moment in time when the second sensor 240 generates the map data 312 of the objects located in the predetermined portion 402 of the surrounding area 250. Finally, the processor 110, via the communication link 316, is configured to transmit the plurality of the LIDAR timestamps 608 to the LIDAR synchronization component 308.

In the non-limiting embodiments of the present technology, the communication link 314 and the communication link 316 are based on the PTP protocol described hereinabove with reference to FIG. 3.

Step 904—Determining, by the Electronic Device, a First Timestamp for the Map Data At step 904, the processor is configured to determine a subsequent LIDAR timestamp of the plurality of the LIDAR timestamps 608, by which the processor 110 would synchronize capturing the image data 310 and capturing the map data 312. To that end, the processor 110 is configured to receive, from the LIDAR synchronization component 308, the indication of the first angular position 408 of the second sensor 240.

In some non-limiting embodiments of the present technology, the processor 110 is configured to determine the subsequent LIDAR timestamp as an immediately following subsequent LIDAR timestamp of the plurality of LIDAR timestamps 608, for example the LIDAR timestamp $Tl_2$ in the embodiments of FIG. 7.

In other non-limiting embodiments of the present technology, the processor 110 is configured to employ a timestamp determination algorithm for determining a LIDAR timestamp for synchronizing the image data 310 and the map data 312.

Step 906—Determining, by the Electronic Device, a Second Timestamp for the Image Data At step 906, the processor is configured to determine a subsequent camera timestamp of the camera timestamps 508. In some non-limiting embodiments of the present technology, the processor 110 determines the subsequent camera timestamp as a subsequent camera timestamp of the camera timestamps 508 preceding the LIDAR timestamp $Tl_2$ in the common time reference 510—which is, in the embodiments of FIG. 7, the camera timestamp $t_7$.

Step 908—Determining, by the Electronic Device, a Temporal Offset Between the First Timestamp and the Second Timestamp At step 908, having determined the LIDAR timestamp $Tl_2$ and the camera timestamp $t_7$ for synchronizing the image data 310 and the map data 312, the processor 110 is further configured to calculate a temporal offset therebetween, which is exemplified by the temporal offset 702 and described above with reference to FIG. 7.

In the non-limiting embodiments of the present technology, the temporal offset 702 is indicative of a difference between moments in time, in the common time reference 510, respectively corresponding to the LIDAR timestamp $Tl_2$ and the camera timestamp $t_7$.

Step 910—Using, by the Electronic Device, the Temporal Offset to Trigger a Delay Between Subsequent Snapshots Generated by the Camera System, Such That (I) at Least One Subsequent Snapshot is Generated by the Camera System and (II) Subsequent Data Points About the Pre-Determined Portion is Generated by the Lidar System, at a Same Future Moment in Time in the Common Time Referential At step 910, the processor is configured to use the temporal offset 702 to trigger a delay between a subsequent snapshots of the image data 310 in such a way that the LIDAR timestamp $Tl_2$ and the camera timestamp $t_7$ would coincide in a future moment in time, and, consequently, the capturing the image data 310 and the capturing the map data 312 would be synchronized by that future moment in time, thereby generating the adjusted schedule for operating the first sensor 230.

In the non-limiting embodiments of the present technology, the processor 110 is configured to use the temporal offset 702 by increasing gap phases of respective scanning phases of the first sensor 230, thereby modifying the pre-determined camera scanning frequency.

In some non-limiting embodiments of the present technology, the processor 110 is configured to increase a gap phase only of one respective subsequent scanning phase. In these embodiments, the processor 110 is configured to trigger the delay only between two subsequent shooting phases of the respective scanning phases of the first sensor 230 preceding the LIDAR timestamp $Tl_2$ in the common time reference 510.

In other non-limiting embodiments of the present technology, the processor 110 is configured to divide the temporal offset 702 equally amongst the subsequent scanning phases of the first sensor 230 preceding the LIDAR timestamp $Tl_2$ in the common time reference 510, and further equally increase each respective gap phase thereof. In these embodiments, the processor 110 is configured to trigger an equal delay between each two consecutive shooting phases of the respective scanning phases of the first sensor 230 preceding the LIDAR timestamp $Tl_2$ in the common time reference 510.

As such, in those non-limiting embodiments of the present technology where the rotational cycle of the second sensor 240 is equal to a predetermined multiplier number of the scanning phases of the first sensor 230, the processor 110 is configured to use the temporal offset 702 by equally spreading it amongst the predetermined multiplier number of subsequent scanning phases of the first sensor 230 preceding the LIDAR timestamp $Tl_2$ in the common time reference 510.

In the non-limiting embodiments of the present technology, the processor 110 is further configured to transmit the so-modified scanning phases, i.e. the adjusted schedule for operating the first sensor 230, to the camera synchronization component 306.

In the non-limiting embodiments of the present technology, the processor 110 is configured to execute the above-described synchronization procedure, including using the temporal offset 702, during the operation of the vehicle 220, i.e. in real time, while the vehicle 220 is moving, for example.

In the non-limiting embodiments of the present technology, the processor 110 can be configured to recalculate the temporal offset 702, thereby repeating the synchronization procedure described above.

In some embodiments of the present technology, the processor 110 is configured to repeat the synchronization procedure before each subsequent LIDAR timestamp of the plurality of LIDAR timestamps 608, i.e. for each subsequent rotational cycle of the second sensor 240. Thus, it can be said that the processor 110 can be configured for synchronizing the capturing the image data 310 and the capturing the map data 312 substantially continuously during the operation of the vehicle 220.

In other non-limiting embodiments of the present technology, the processor 110 is configured to repeat the synchronization procedure after a predetermined number of subsequent rotational cycles of the second sensor 240.

Thus, in the non-limiting embodiments of the present technology, having caused the camera system 302 to provide the image data 310 in the common time reference 510 at a given scanning phase (the scanning phase corresponding to the timestamp $t_1$ of the camera timestamps 508, for example) and calculated the temporal offset 702, the processor 110 is configured to use it at least for a predetermined number of subsequent scanning phases of the camera system 302 (for example, five (5), in the embodiments of FIGS. 7 and 8) for synchronization only within a single subsequent rotational cycle of the second sensor 240 (the rotational cycle corresponding to the LIDAR timestamp $Tl_2$ of the LIDAR timestamps 608, for example).

In other non-limiting embodiments, the processor 110 is configured to use the temporal offset 702 for an additional predetermined number of scanning phases of the camera system 302 for synchronization, using the so-determined temporal offset 702, within more than the single subsequent rotational cycle of the second sensor 240.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of synchronizing data for operating a Self-Driving Vehicle (SDV), the data being generated by a camera system and a LIDAR system of the SDV, the data including:
   (i) image data of the camera system mounted onto the SDV for generating the image data about a pre-determined portion of a surroundings of the SDV,
      the camera data being in a form of a sequence of snapshots generated by the camera system with a camera scanning frequency,
      the sequence of snapshots representing the pre-determined portion at different moments in time,
   (ii) map data from a LIDAR system mounted to the SDV for generating the map data about the surroundings of the SDV including the pre-determined portion,
      the map data being in a form of data points generated by the LIDAR system,
      the data points representing objects located in different portions of the surroundings of the SDV at different moments in time, the method comprising:
      causing the camera system and the LIDAR system to provide the image data and the map data to the electronic device in a common time referential,
      the common time referential being an indication of an absolute time during which the data is generated;
      determining a first timestamp for the map data,
      the first timestamp corresponding to a given moment in time in the common time referential during which the LIDAR system generated data points representing objects located in the pre-determined portion;
      determining a second timestamp for the image data,
      the second timestamps corresponding to an other given moment in time in the common time referential during which the camera system has been generating a given snapshot of the pre-determined portion;
      determining a temporal offset between the first timestamp and the second timestamp, the temporal offset being indicative of a difference between the given moment in time and the other given moment in time in the common time referential;

using the temporal offset to trigger a delay between subsequent snapshots generated by the camera system, the using comprising adjusting the camera scanning frequency by dividing a duration of the temporal offset among a number of subsequent snapshots to add a respective time delay thereamong, such that (i) at least one subsequent snapshot is generated by the camera system and (ii) subsequent data points about the pre-determined portion is generated by the LIDAR system, at a same future moment in time in the common time referential.

2. The method of claim 1, wherein the using the temporal offset is executed during operation of the SDV.

3. The method of claim 1, wherein the synchronizing the data for operating the SDV is executed substantially continuously during operation of the SDV.

4. The method of claim 1, wherein the causing the camera system to provide the image data is executed during a first iteration of an operation of the camera system, and wherein the using is executed for a subsequent operation of the camera system.

5. The method of claim 4, where the subsequent operation is a pre-determined number of subsequent iterations.

6. The method of claim 5, wherein the method of claim 1 is repeated after the pre-determined number of subsequent iterations for an additional number of subsequent iterations.

7. The method of claim 1, wherein the camera system has a field of view that coincides with the pre-determined portion of the surroundings of the SDV when mounted onto the SDV.

8. The method of claim 1, wherein the causing includes employing a PTP protocol to communicate the indication of the absolute time to the camera system and the LIDAR system.

9. The method of claim 1, wherein the indication of absolute time is an indication of astronomical time.

10. The method of claim 1, wherein the LIDAR system is a rotational LIDAR system, such that the LIDAR system generates data points representing objects located in a first portion of the surroundings of the SDV at a first moment in time and where the first portion is associated with an angular position of the LIDAR system at the first moment in time.

11. The method of claim 10, wherein the LIDAR system generates data points representing objects located in a second portion of the surroundings of the SDV at a second moment in time and where the second portion is associated with the angular position of the LIDAR system at the second moment in time, the angular position of the LIDAR system being different at the first moment in time and at the second moment in time, the first portion being different from the second portion.

12. The method of claim 10, wherein the determining the first timestamp comprises:

acquiring, an indication of a pre-determined angular position of the LIDAR system, such that when the LIDAR is at the pre-determined angular position the LIDAR generates data points about objects located in the pre-determined portion, determining, the first timestamp as a moment in time in the common time referential at which the LIDAR system is at the pre-determined angular position.

13. The method of claim 12, wherein the determining the first timestamp includes employing a timestamp determination algorithm.

14. The method of claim 1, wherein the given snapshot is generated by the camera system during a snapshot.

15. The method of claim 1, wherein the dividing the duration of the temporal offset comprises dividing the duration of the temporal offset equally among the number of the subsequent snapshots.

16. The method of claim 15, wherein the LIDAR system operates in rotational cycles indicative of a LIDAR scanning frequency and the camera system operates in scanning phases indicative of the camera scanning frequency, and wherein a given rotational cycle of the LIDAR system equals a pre-determined multiplier number of scanning phases of the camera system, and wherein the number of subsequent snapshots corresponds to the pre-determined multiplier number of scanning phases of the camera system.

17. An electronic device comprising:
at least one processor;
at least one non-transitory computer-readable medium comprising data, the data being generated by a camera system and a LIDAR system that are mounted onto a Self-Driving Vehicle (SDV) and are communicatively coupled, via a communication interface, with the at least one processor, the data including:
(i) image data of the camera system mounted onto the SDV for generating the image data about a pre-determined portion of a surroundings of the SDV,
the camera data being in a form of a sequence of snapshots generated by the camera system with a camera scanning frequency,
the sequence of snapshots representing the pre-determined portion at different moments in time,
(ii) map data from a LIDAR system mounted to the SDV for generating the map data about the surroundings of the SDV including the pre-determined portion,
the map data being in a form of data points generated by the LIDAR system,
the data points representing objects located in different portions of the surroundings of the SDV at different moments in time, at least one non-transitory computer-readable medium further comprising executable instructions that, when executed by the at least one processor, cause the electronic device to:

cause the camera system and the LIDAR system to provide the image data and the map data in a common time referential,
the common time referential being an indication of an absolute time during which the data is generated;

determine a first timestamp for the map data,
the first timestamp corresponding to a given moment in time in the common time referential during which the LIDAR system generated data points representing objects located in the pre-determined portion;

determine a second timestamp for the image data, the second timestamps corresponding to an other given moment in time in the common time referential during which the camera system has been generating a given snapshot of the pre-determined portion;

determine, a temporal offset between the first timestamp and the second timestamp,
- the temporal offset being indicative of a difference between the given moment in time and the other given moment in time in the common time referential;

use the temporal offset to trigger a delay between subsequent snapshots generated by the camera system by adjusting the camera scanning frequency including dividing a duration of the temporal offset among a number of subsequent snapshots to add a respective time delay thereamong,
- such that (i) at least one subsequent snapshot is generated by the camera system and (ii) subsequent data points about the pre-determined portion is generated by the LIDAR system, at a same future moment in time in the common time referential.

18. The electronic device of claim 17, wherein the at least one processor causes the electronic device to use the temporal offset during operation of the SDV.

19. The electronic device of claim 17, wherein the at least one processor causes the electronic device to cause the camera system to provide the image data during a first iteration of an operation of the camera system and use the temporal offset for a subsequent operation of the camera system.

* * * * *